(12) United States Patent
Fukuyama et al.

(10) Patent No.: US 8,723,356 B2
(45) Date of Patent: *May 13, 2014

(54) DISCHARGE DEVICE FOR VEHICLE

(75) Inventors: Takaki Fukuyama, Kiyosu (JP); Shigeyuki Suzuki, Kiyosu (JP); Eiji Kitano, Toyota (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 198 days.

This patent is subject to a terminal disclaimer.

(21) Appl. No.: 13/229,813

(22) Filed: Sep. 12, 2011

(65) Prior Publication Data

US 2012/0062029 A1 Mar. 15, 2012

(30) Foreign Application Priority Data

Sep. 15, 2010 (JP) ................................ 2010-206822

(51) Int. Cl.
*B60L 1/00* (2006.01)

(52) U.S. Cl.
USPC ......................................................... 307/9.1

(58) Field of Classification Search
USPC ......................................................... 307/9.1
See application file for complete search history.

(56) References Cited

U.S. PATENT DOCUMENTS

| 7,063,019 B2 | 6/2006 | Parks et al. | |
|---|---|---|---|
| 8,432,648 B2 * | 4/2013 | Fukuyama et al. | 361/23 |
| 2008/0151454 A1 | 6/2008 | Uhl | |
| 2009/0058339 A1 | 3/2009 | Kitano | |
| 2010/0200377 A1 | 8/2010 | Arakawa | |
| 2010/0214055 A1 | 8/2010 | Fuji et al. | |

FOREIGN PATENT DOCUMENTS

| CN | 1960900 A | 5/2007 |
|---|---|---|
| CN | 101379692 A | 3/2009 |
| CN | 101814720 A | 8/2010 |
| DE | 19712387 A1 | 10/1997 |
| JP | 48-100663 A | 12/1973 |
| JP | 59-41955 U | 3/1984 |
| JP | 61-214723 A | 9/1986 |
| JP | 61-189790 U | 11/1986 |

(Continued)

OTHER PUBLICATIONS

Office Action dated Jul. 31, 2012 in corresponding JP Application No. 2010-206822.

(Continued)

*Primary Examiner* — Robert L. Deberadinis
(74) *Attorney, Agent, or Firm* — Posz Law Group, PLC (57) ABSTRACT

A power control unit (PCU) case accommodates an electric circuit of a PCU, which includes a first capacitor and is operated by electricity supply from a storage battery. In the electric circuit, a first bus bar is connected to a part in the vicinity of the anode of the first capacitor, and a second bus bar is connected to a part in the vicinity of the cathode of the first capacitor. A discharge mechanism is formed by connecting in series a switch activated by an explosive actuator and a discharging resistor. The discharge mechanism is integrally fixed to the PCU case. When a collision of the vehicle is detected, the discharge mechanism short-circuits the first bus bar and the second bus bar with each other through the activation of the switch. Accordingly, the discharge mechanism is connected in parallel with the first capacitor, so that the discharging resistor discharges the first capacitor.

8 Claims, 9 Drawing Sheets

(56) References Cited

FOREIGN PATENT DOCUMENTS

| | | |
|---|---|---|
| JP | 2004-129367 A | 4/2004 |
| JP | 2005-327951 A | 11/2005 |
| JP | 2006-081393 A | 3/2006 |
| JP | 2006-141158 A | 6/2006 |
| JP | 2006-224772 A | 8/2006 |
| JP | A-2007-513314 | 5/2007 |
| JP | A-2010-115067 | 5/2010 |
| JP | A-2010-141958 | 6/2010 |
| JP | A-2010-183803 | 8/2010 |
| JP | A-2011-166938 | 8/2011 |

OTHER PUBLICATIONS

Office action dated Nov. 29, 2013 in the corresponding CN application No. 201110272101.0 (and English translation).

* cited by examiner

Fig.11

DISCHARGE DEVICE FOR VEHICLE

BACKGROUND OF THE INVENTION

The present invention relates to a discharge device employed in a vehicle that includes an electric circuit having capacitors, and forcibly stops electricity supply to the electric circuit when an abnormality related to a collision is detected. More specifically, the present invention relates to a discharge device that forcibly discharges capacitors, in addition to stopping the electricity supply, when an abnormality is detected.

In recent years, vehicles such as hybrid vehicles, electric vehicles, and fuel cell vehicles have been equipped with in addition to motors and a storage battery, which function as power source, an electric circuit for driving the motors with electricity from the storage battery. The electric circuit includes a converter and inverters. The converter raises the voltage of the electricity supplied from the storage battery, and outputs the electricity to the inverter. The inverters convert the received direct-current electricity to an alternating-current, which is suitable for driving motors, and delivers the electricity to the motors.

In such vehicles, when an abnormality such as a collision is detected, the connection between the storage battery and the electric circuit is interrupted to forcibly stop the electricity supply to the electric circuit, thereby eliminating adverse effects caused by high voltage. Also, in a vehicle equipped with an electric circuit having capacitors, the capacitors may be forcibly discharged, in addition to stoppage of the electricity supply.

For example, Japanese Laid-Open Patent Publication No. 2006-141158 discloses a vehicle control device that, when a vehicle collision is detected, zero torque control is executed to quickly discharge capacitors during traveling of the vehicle. The zero torque control refers to control in which a motor driving circuit is operated without generating torque from the rotary shaft of the motor-generator. To execute the zero torque control, the charge (electricity) stored in either the capacitors of the inverters or the capacitor of the converter is used.

Before execution of the zero torque control, the automatic transmission is switched to the parking lock state. Accordingly, this is to prevent torque from being transmitted to the drive wheels in the unlikely event that the motor-generator generates torque during the zero torque control.

However, in the vehicle control device of the above publication, the zero torque control is executed to discharge the capacitors only on condition that the converter and the inverters are functioning normally. If the converter and the inverters are not functioning normally, the zero torque control cannot be executed properly. As a result, the capacitors cannot be properly discharged. That is, whether or not the capacitors can be properly discharged is greatly influenced by the state of the converter and the inverters.

Particularly, at the time of detection of a collision, at which discharge is performed, the converter and the inverters are likely to receive an impact. This is likely to hinder proper execution of the zero torque control.

An additional discharging mechanism may be provided to discharge the capacitors. However, if such a discharge mechanism is provided at a position located away from the case accommodating the electric circuit, the wires connecting the discharge mechanism to the electric circuit are likely to be broken by the impact.

SUMMARY OF THE INVENTION

Accordingly, it is an objective of the present invention to provide a discharge device for a vehicle that is reliably activated to discharge capacitors when an abnormality related to a collision of a vehicle is detected.

To achieve the foregoing object and in accordance with one aspect of the present invention, a discharge device for use in a vehicle is provided. The vehicle includes an electric circuit, at least one capacitor, and a case for accommodating the electric circuit. The electric circuit is activated by electricity supply from an electricity source. The capacitor is contained in the electric circuit, and has an anode and a cathode. When an abnormality related to a collision of the vehicle is detected, the electricity supply from the electricity source to the electric circuit is stopped. The discharge device includes a discharge mechanism, a first bus bar, and a second bus bar. The discharge mechanism discharges the at least one capacitor when the electricity supply from the electricity source to the electric circuit is stopped due to said abnormality. The first bus bar is connected to a part of the electric circuit that is in the vicinity of the anode of the at least one capacitor. The second bus bar is connected to a part of the electric circuit that is in the vicinity of the cathode of the at least one capacitor. The discharge mechanism includes a switch activated by an explosive type actuator, and a discharging resistor that is connected with the switch in series. The discharge mechanism is integrated with the case. At the detection of the abnormality, the switch is activated to short-circuit the first bus bar and the second bus bar with each other, thereby connecting the discharge mechanism in parallel with the at least one capacitor, so that the at least one capacitor is discharged.

In accordance with another aspect of the present invention, a vehicle is provided that includes an electric circuit, at least one capacitor, and a case for accommodating the electric circuit. The electric circuit is activated by electricity supply from an electricity source. The capacitor is contained in the electric circuit, and has an anode and a cathode. When an abnormality related to a collision of the vehicle is detected, the electricity supply from the electricity source to the electric circuit is stopped. The discharge device includes a discharge mechanism, a first bus bar, and a second bus bar. The discharge mechanism discharges the at least one capacitor when the electricity supply from the electricity source to the electric circuit is stopped due to said abnormality. The first bus bar is connected to a part of the electric circuit that is in the vicinity of the anode of the at least one capacitor. The second bus bar is connected to a part of the electric circuit that is in the vicinity of the cathode of the at least one capacitor. The discharge mechanism includes a switch activated by an explosive type actuator, and a discharging resistor that is connected with the switch in series. The discharge mechanism is integrated with the case. At the detection of the abnormality, the switch is activated to short-circuit the first bus bar and the second bus bar with each other, thereby connecting the discharge mechanism in parallel with the at least one capacitor, so that the at least one capacitor is discharged.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A discharge control device for a vehicle according to a first embodiment of the present invention will now be described with reference to FIGS. 1 to 5.

Figure 1:
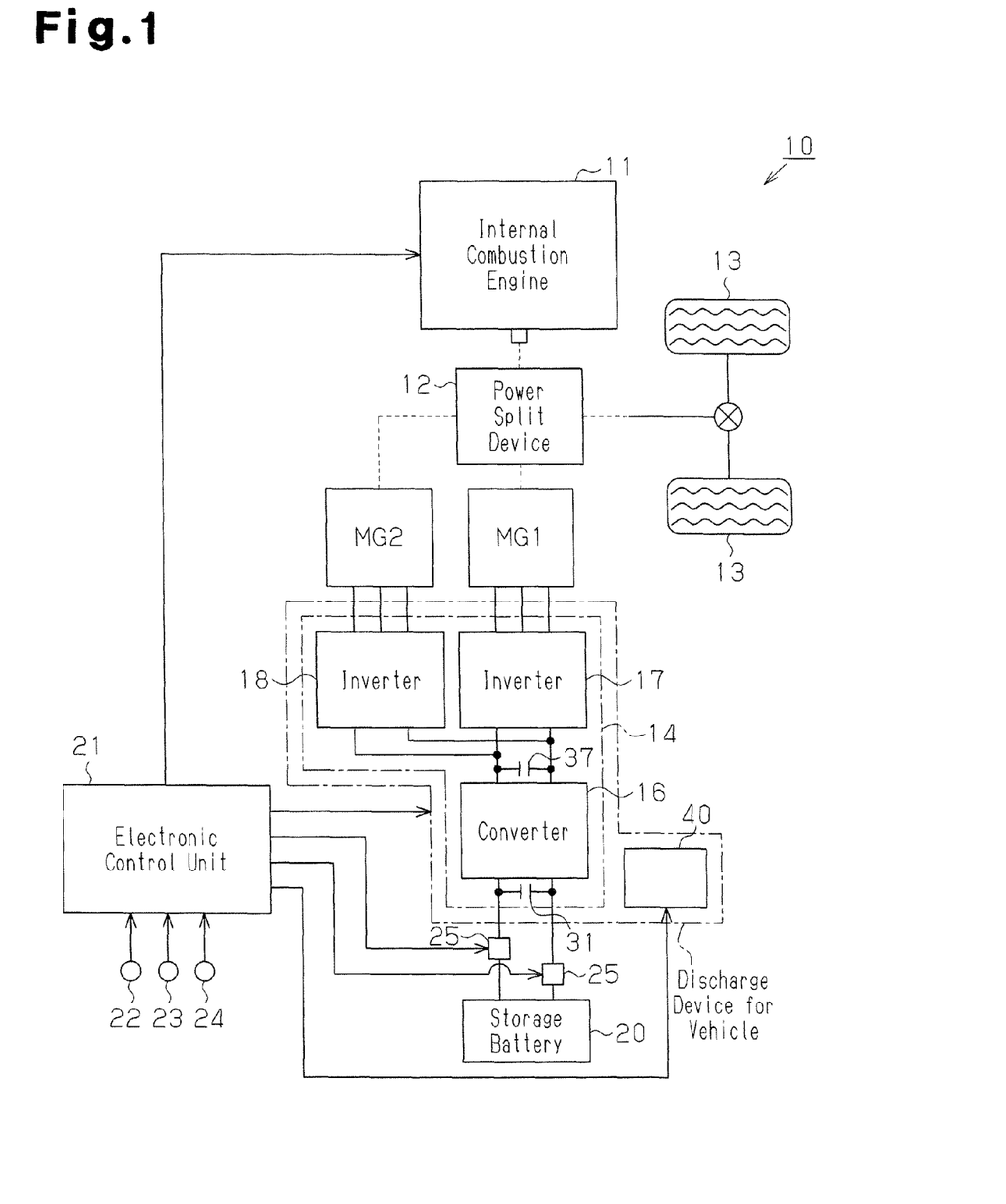
FIG. 1 is a diagram showing a vehicle on which a discharge device for a vehicle according to a first embodiment of the present invention is mounted.

FIG. 1 schematically shows a hybrid vehicle (hereinafter, simply referred to a vehicle), to which the discharge device for a vehicle according to the present embodiment is applied. As shown in FIG. 1, a vehicle 10 includes, as a power source, an internal combustion engine 11, a first motor-generator MG1, a power split device 12, and a second motor-generator MG2. Three-phase alternating current synchronous motors may be used as the first and second motor-generators MG1, MG2. The power split device 12 includes a planetary gear train and distributes the power generated by the internal combustion engine 11 to the first motor-generator MG1 and drive wheels 13. The second motor-generator MG2 chiefly functions as an electric motor and generates auxiliary power for driving the drive wheels 13 separately from the power of the internal combustion engine 11.

A power control unit (PCU) 14 for controlling operation of the first and second motor-generators MG1, MG2 is mounted on the vehicle 10. The PCU 14 is housed in a dedicated case (hereinafter, referred to as a PCU case) 15 (see FIG. 3). The PCU 14 has on-vehicle electric devices such as a converter 16 and inverters 17, 18. The converter 16 raises the voltage of electricity supplied from a storage battery 20, and outputs the electricity to the inverters 17, 18. The inverters 17, 18 convert the input direct-current electricity into an alternating-current suitable for driving the first and second motor-generators MG1, MG2, and outputs the alternating-current electricity to the first and second motor-generators MG1, MG2, respectively.

The vehicle 10 has an electronic control unit 21, which is constructed with a microcomputer as a dominant constituent. The electronic control unit 21 is connected various types of sensors. The various types of sensors include, for example, an acceleration pedal sensor 22 for detecting the amount of depression of the acceleration pedal (not shown), a speed sensor 23 for detecting the travel speed of the vehicle 10, and a collision sensor 24 for detecting presence or absence of an abnormality related to a collision of the vehicle 10 (the abnormality being a collision itself in the present embodiment).

The electronic control unit 21 receives output signals from the various types of sensor 22 to 24, and performs various types of calculations based on the signals. Based on the calculation results, the electronic control unit 21 executes various types of control related to the driving of the vehicle 10, for example, the control of the operation of the engine 11, the control of the PCU 14 (the control of the operation of the converter 16 and the control of the operation of the inverters 17, 18).

The various types of control are executed basically according to the following concept.

For example, the starting of the internal combustion engine 11 is executed by the first motor-generator MG1, which is driven by receiving electricity from the storage battery 20.

At starting of the vehicle 10 or during low load traveling, the driving efficiency of the engine 11 is lowered. In such a state, the engine 11 is stopped, and the second motor-generator MG2 is driven by the electricity supply from the storage battery 20. The vehicle 10 is driven by the torque generated by the second motor-generator MG2, so that the fuel consumption is reduced.

In a state where the engine 11 can operate at high efficiency, for example, during steady motion of the vehicle 10, the power of the engine 11 is split into two paths by the power split device 12. One part of the split power is transmitted, as a drive force, to the drive wheels 13, so that the drive wheels 13 are rotated. The other part of the split power is transmitted to the first motor-generator MG1, so that the first motor-generator MG1 functions as a generator. The electricity generated by the first motor-generator MG1 is used for driving the second motor-generator MG2, so that the power of the internal combustion engine 11 is assisted. This reduces the fuel consumption.

At acceleration of the vehicle 10, the power of the internal combustion engine 11 is increased and transmitted to the drive wheels 13. The power of the engine 11 is also transmitted to the first motor-generator MG1 via the power split device 12, so that the first motor-generator MG1 generates electricity. The generated electricity and the electricity from the storage battery 20 drive the second motor-generator MG2. Accordingly, the drive force of the second motor-generator MG2 is added to the power of the engine 11, so that the vehicle accelerates.

For deceleration of the vehicle 10, the second motor-generator MG2 is rotated by the power applied by the drive wheels 13, so that the second motor-generator MG2 generates electricity. The generated electricity is recovered by the storage battery 20.

Figure 2:
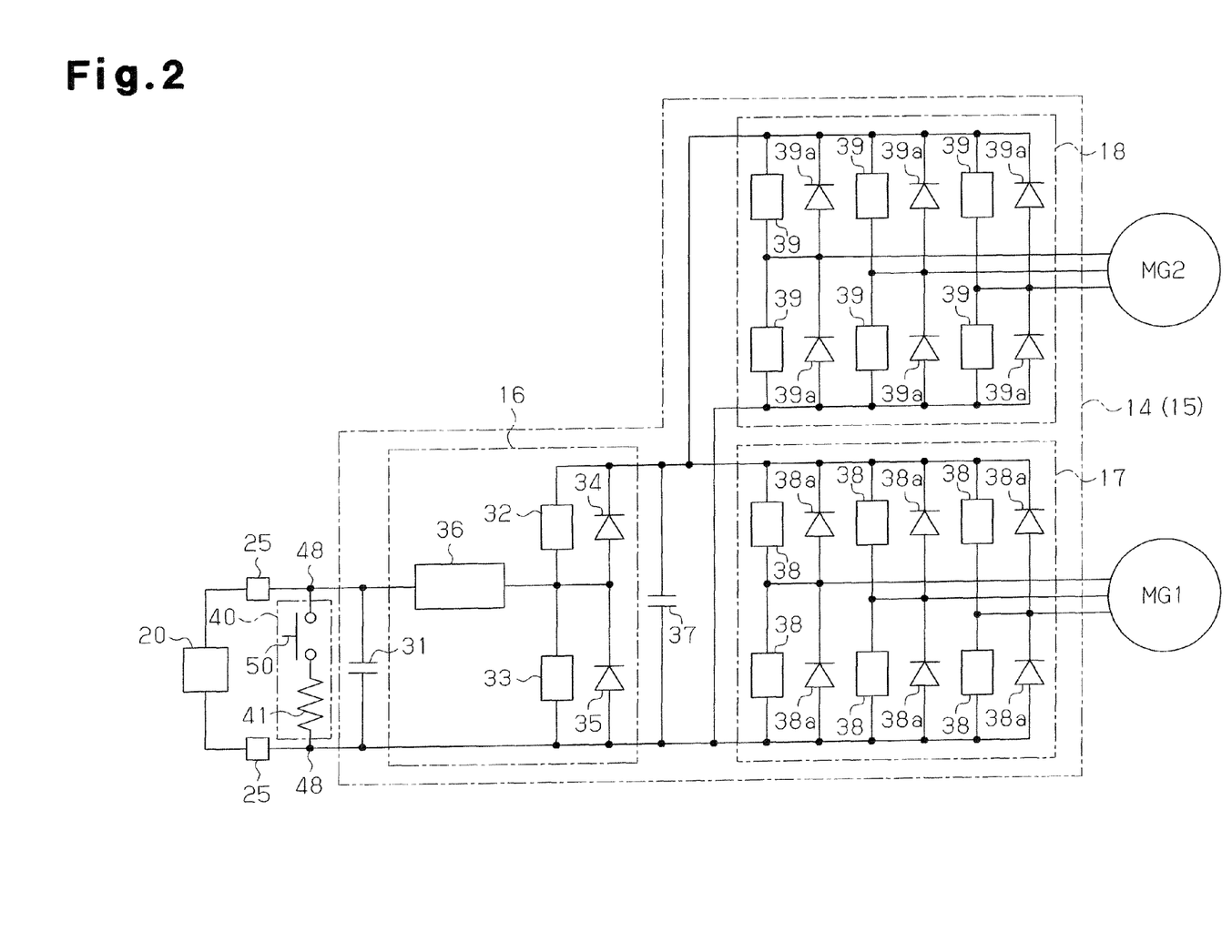
FIG. 2 is a circuit diagram showing the electric circuit related to the discharge device for a vehicle according to the first embodiment.

FIG. 2 shows the electric circuit including the PCU 14.

As shown in FIG. 2, the storage battery 20 is connected to the converter 16. A first capacitor 31 is provided between the positive terminal and the negative terminal of the storage battery 20. The input voltage of a converter circuit, which will be discussed below, is applied to the first capacitor 31. The first capacitor 31 reduces fluctuation of voltage applied to the converter 16 by the storage battery 20.

The converter 16 includes two switching elements 32, 33 connected in series, specifically, two insulated-gate bipolar transistors. Diodes 34, 35 are connected in parallel with the switching elements 32, 33, respectively. The voltage of the storage battery 20, for example, 200 volt, is applied to one of the switching elements 32, 33. Specifically, the voltage of the storage battery 20 is applied to a point between the drain terminal and the source terminal of the switching element 33. The positive terminal of the storage battery 20 and the switching element 33 (specifically, the drain terminal of the switching element 33) are connected to each other via a reactor 36. Also, a second capacitor 37 is connected between the switching elements 32, 33, which are connected to each other in series. Specifically, the second capacitor 37 is connected between the drain terminal of the switching element 32 and the source terminal of the switching element 33.

In the control of the operation of the converter 16, the operation of the switching elements 32, 33 is controlled. Through this control, a voltage that is higher than the voltage of the storage battery 20, for example, 650 volts, is output to the point between the serially connected switching elements 32, 33, using the characteristics of the reactor 36. Fluctuation of the output voltage of the converter 16 is reduced by the second capacitor 37. In the first embodiment, the circuit formed by the switching elements 32, 33, the diodes 34, 35, and the reactor 36 functions as a converter circuit.

The output voltage of the converter 16 is input to the inverters 17, 18. The inverter 17 has six switching elements 38, and the inverter 18 also has six switching elements 39. Specifically, the inverters 17, 18 each have a three-phase bridge rectifier formed by insulated-gate bipolar transistors. The inverters 17, 18 are connected to the first and second motor-generators MG1, MG2, respectively. Diodes 38a, 39a are each connected in parallel with a corresponding one of the switching elements 38, 39.

In the operation control of the inverters 17, 18, the operation of the switching elements 38, 39 is controlled. Through the control, the direct-current electricity from the converter 16 is converted into an alternating-current electricity suitable for driving the first and second motor-generators MG1, MG2, and supplied to the first and second motor-generators MG1, MG2. Through the operation control of the inverters 17, 18, the first and second motor-generators MG1, MG2 are driven in a manner suitable for the driving state of the vehicle 10.

Figure 3:
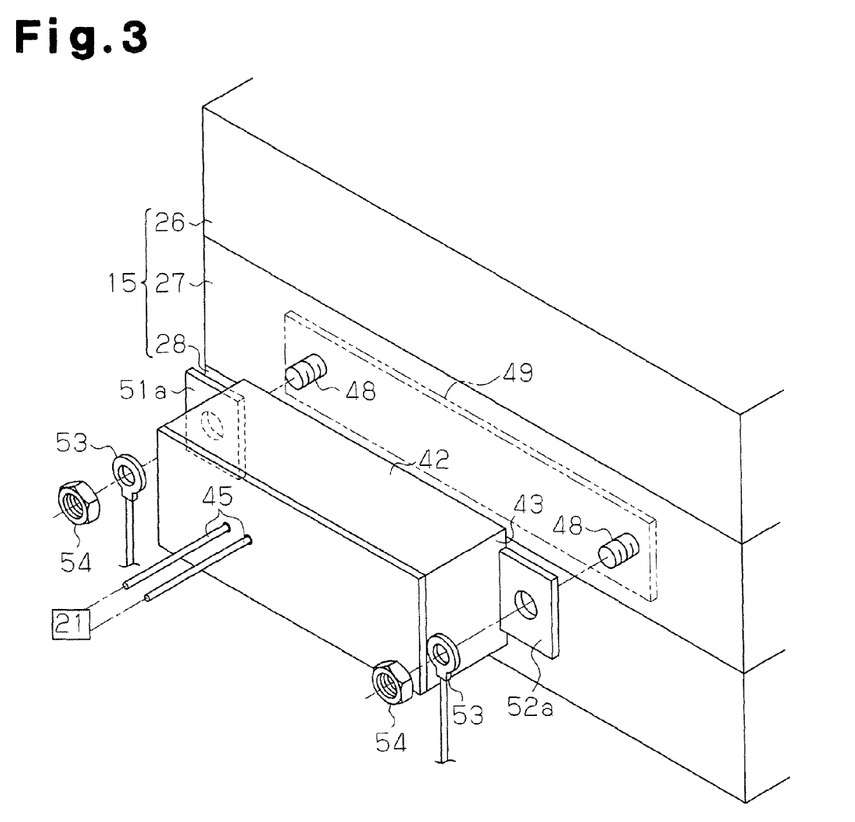
FIG. 3 is a partial perspective view showing a power control unit (PCU) case and a discharge mechanism integrated with the outer wall of the PCU case in the electric circuit of FIG. 2.

The PCU case 15 for accommodating the PCU 14 is arranged in the engine compartment and fixed to the vehicle body. As shown in FIG. 3, the PCU case 15 is partitioned into a center case 27, an upper case 26 arranged on top of the center case 27, and a lower case 28 arranged underneath the center case 27. The upper case 26, the center case 27, and the lower case 28 are made of metal such as aluminum, iron, or magnesium. A plurality of on-vehicle electric devices constituting the PCU 14 are each arranged in one of the upper case 26, the center case 27, and the lower case 28. For example, the inverters 17, 18 are arranged in the center case 27, the first capacitor 31 and the converter 16 are arranged in the upper case 26, and the second capacitor 37 is arranged in the lower case 28.

When the vehicle 10 is damaged, for example, by a collision, electric leakage (shorting) may occur from the electric circuit of the PCU 14. In a hybrid vehicle having, as drive sources, the internal combustion engine 11 and the first and second motor-generators MG1, MG2 as described above, the voltage applied to the electric circuit of the PCU 14 tends to be high. Therefore, prevention of electric leakage from the electric circuit is highly desirable. Accordingly, in the first embodiment, to prevent such leakage, breakers 25 are provided that break the connection between the storage battery 20 and the PCU 14 in a collision of the vehicle 10 as shown in FIGS. 1 and 2. When a collision of the vehicle 10 is detected based on an output signal of the collision sensor 24, the breakers 25 are activated, so that the electricity supply from the storage battery 20 to the electric circuit of the PCU 14 is stopped.

Also, the PCU 14 incorporates the first capacitor 31 and the second capacitor 37. Therefore, when the PCU 14 operates, specifically, when the PCU 14 receives the electricity supply from the storage battery 20, the first capacitor 31 and the second capacitor 37 are charged. Therefore, if the electricity supply from the storage battery 20 to the electric circuit of the PCU 14 is simply stopped by activation of the breakers 25, the voltage of the electric circuit of the PCU 14 is maintained to an unnecessarily high level.

In this respect, according to the first embodiment, when an abnormality related to a collision of the vehicle 10 (a collision in this case) is detected by the collision sensor 24, the breakers 25 are activated to stop the electricity supply from the storage battery 20 to the electric circuit of the PCU 14, and the discharge mechanism 40 discharges the first capacitor 31.

Figure 4:
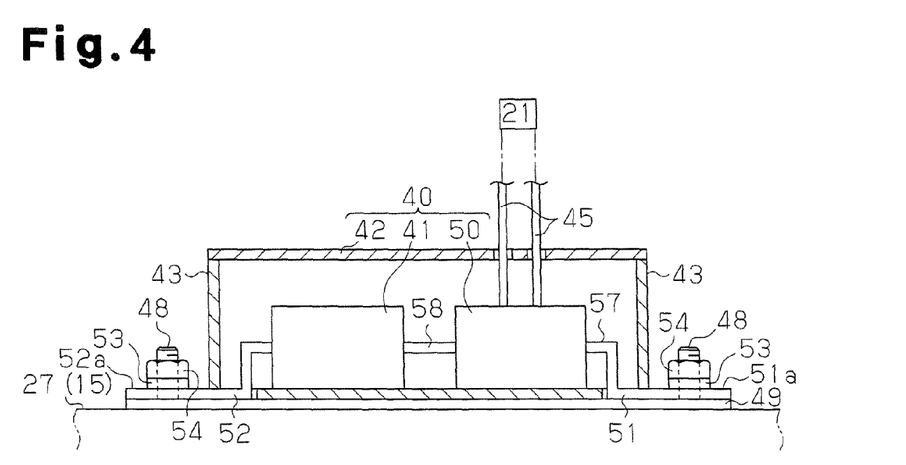
FIG. 4 is a schematic cross-sectional plan view showing the interior of the case of the discharge mechanism of FIG. 3.

As shown in FIGS. 2 to 4, the discharge mechanism 40 has an elongated discharge mechanism case 42, a switch 50, and a discharging resistor 41. The switch 50 and the discharging resistor 41 are arranged in the discharge mechanism case 42 and connected to each other in series.

A first bus bar 51 is connected to the switch 50, and a second bus bar 52 is connected to the discharging resistor 41. Bus bars are formed punching, into the shapes of desired circuits, an electroconductive plate made, for example, of copper, a copper alloy or brass, and bending the punched plate. A part of the first bus bar 51 and a part of the second bus bar 52 include connecting terminals 51a, 52a, respectively. The connecting terminals 51a, 52a extend through side plates 43, which form both ends of the discharge mechanism case 42 with respect to the longitudinal direction, and protrude outward from the side plates 43.

On the electric circuit of the PCU 14, a connection portion (bolt) 48 is provided in each of a part in the vicinity of the anode of the first capacitor 31 and a part the vicinity of the cathode of the first capacitor 31. These connection portions 48 protrude from separated positions on the outer wall of the PCU case 15 (the center case 27).

Figure 5A:
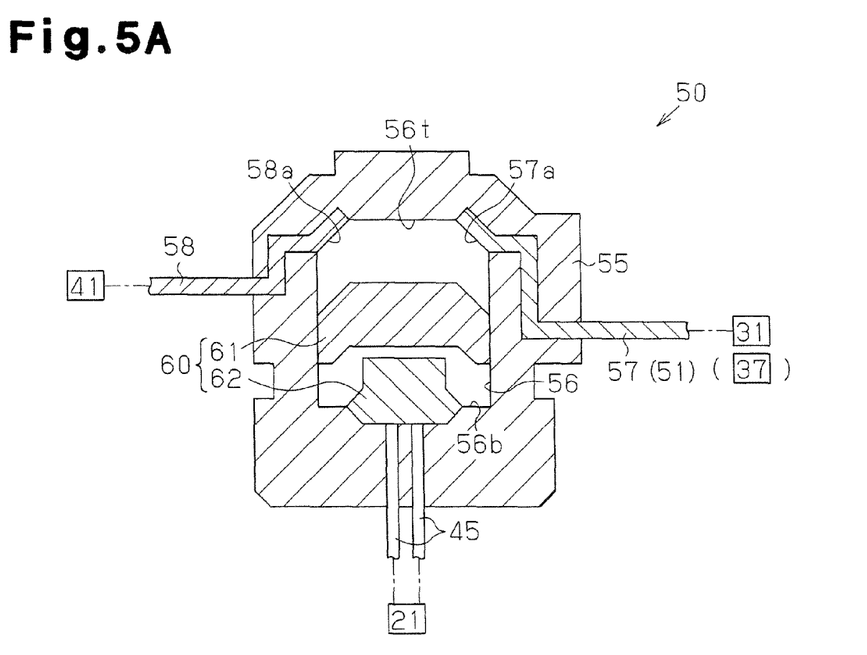
FIGS. 5A and 5B are cross-sectional views showing the internal structure of the switch according to the first embodiment.
Figure 5B:
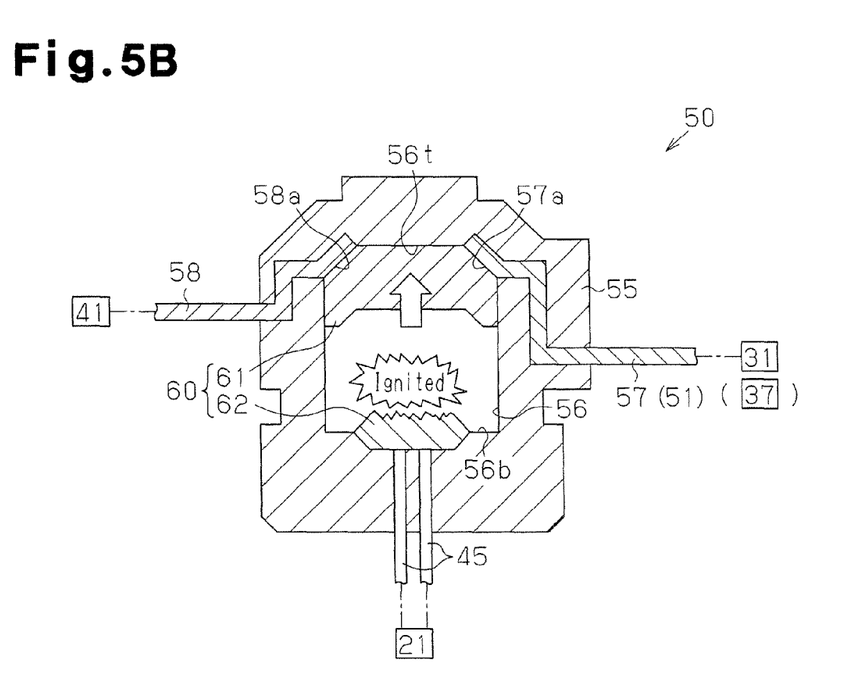

The connection portions 48 are passed through the connecting terminals 51a, 52a and the positive side connector 53 and the negative side connector 53 of the storage battery 20. In this state, nuts 54 are threaded to the connection portions 48. The nuts 54 are fastened to secure the connectors 53 and the connecting terminals 51a, 52a to the connection portions 48. Accordingly, the connectors 53 and the connecting terminals 51a, 52a are electrically connected to the connection portions 48, and the discharge mechanism 40 is integrally fixed to the outer wall of the PCU case 15. A member assigned reference numeral "49" in FIGS. 3 and 4 is an insulation plate that is located between the PCU case 15 (the center case 27) and the connecting terminals 51a, 52a to electrically insulate these from each other. Members assigned reference numeral "45" in FIGS. 3 to 5 are cables for connecting the electronic control unit 21 to a gas generation portion 62 of the switch 50, which will be discussed below.

The internal structure of the switch 50 will now be described with reference to FIGS. 5A and 5B. The outer shell of the switch 50 is formed by a housing 55. A substantially columnar cylinder 56 is formed in the housing 55. The cylinder 56 extends along the axial direction of the housing 55, or in a vertical direction as viewed in FIG. 5A. To distinguish the ends of the cylinder 56 in the axial direction from each other, one end (the upper end as viewed in FIG. 5A) is defined as a top 56t, and the other end (the lower end as viewed in FIG. 5A) is defined as a bottom 56b.

The switch 50 is configured such that two separate terminals, or a first terminal 57 and a second terminal 58 connect the interior of the cylinder 56 to the outside of the housing 55. The first terminal 57 is formed by the first bus bar 51, which is connected to the anode of the first capacitor 31, specifically, by a part of the first bus bar 51 that is located in the switch 50. In contrast, the second terminal 58 is connected to the discharging resistor 41. A part of the first terminal 57 (a first contact 57a) and a part of the second terminal 58 (a second contact 58a) are exposed at the top 56t of the cylinder 56.

An explosive type actuator 60 is arranged in the housing 55. The explosive type actuator 60 is activated in response to detection of a collision of the vehicle 10. The explosive type actuator 60 includes a substantially columnar movable portion 61, which is located in the cylinder 56, and the gas generation portion 62, which generates combustion gas by igniting and burning the explosive in response to a signal from the electronic control unit 21. The movable portion 61 is made of a high electric conductivity material such as an electrically conducting material or an iron-based material. The gas generation portion 62 is attached to the bottom 56b so as to be arranged between the bottom 56b and the movable portion 61.

When the explosive is ignited and burned in the gas generation portion 62, generated combustion gas pushes the movable portion 61, so that the movable portion 61 is moved within the cylinder 56 from the bottom 56b toward the top 56t. In general, the explosive type actuator 60 is quick to be activated, inexpensive and has a high operation reliability, compared to other types of switches such as electromagnetic switches. In the first embodiment, such an explosive type actuator 60 is used to drive the switch 50.

In the first embodiment, a part of the movable portion 61 that is on the advancing side when the movable portion 61 moves (a part that faces the top 56t) is tapered toward the end. That is, the outer shape of the corners of the part is tapered. Likewise, the inner shape of the corners of the top 56t of the cylinder 56 is tapered toward the advancing side of the movable portion 61. The first contact 57a and the second contact 58a are formed to be exposed to the interior of the cylinder 56 on the tapered sections (corners) of the cylinder 56. That is, the first contact 57a and the second contact 58a have such shapes that the distance therebetween is reduced toward the advancing side of the movable portion 61.

In the above described structure, when the movable portion 61 is moved, the advancing part of the movable portion 61 is fitted in a part of the cylinder 56 close to the top 56t. At this time, the advancing part of the movable portion 61 fits into a space between the first contact 57a and the second contact 58a (see FIG. 5B). Accordingly, the bearing stress at the contacting parts of the movable portion 61 and the first contact 57a and the bearing stress at the contacting parts of the movable portion 61 and the second contact 58a are both increased. This ensures the connection between the first contact 57a and the second contact 58a via the movable portion 61.

As the discharging resistor 41 has such a property that it is possible to sufficiently discharge the first capacitor 31 within a desired period of time, for example, within a few minutes.

The discharge device for a vehicle according to the first embodiment is formed by adding the discharge mechanism 40 to the PCU 14 (see FIG. 1). According to the discharge device for a vehicle, the discharge mechanism 40 operates in the following manner in accordance with a result of detection by the collision sensor 24 (whether or not there has been a collision of the vehicle 10).

<When No Collision is Detected>

The electronic control unit 21 does not send a command signal for activating the gas generation portion 62 to the gas generation portion 62. In the gas generation portion 62, the explosive is not ignited, and no combustion gas is generated. In the switch 50, the movable portion 61 is located at a position where it does not contact the first contact 57a or the second contact 58a (see FIG. 5A). Therefore, the first contact 57a and the second contact 58a are not connected to each other in the switch 50. The anode of the first capacitor 31 and the discharging resistor 41 are therefore not connected to each other.

Therefore, even though the discharge mechanism 40 for discharging the first capacitor 31 is provided, the discharge mechanism 40 has little influence on the properties of the electric circuit of the PCU 14 (see FIG. 2), which contains the first capacitor 31, when no collision of the vehicle 10 is detected. Thus, when providing the discharge mechanism 40 to discharge the first capacitor 31, the discharge mechanism 40 is applied to the PCU 14 substantially without changing the electric circuit of the PCU 14. As described above, according to the first embodiment, a discharge device for a vehicle can be easily obtained by simply adding the discharge mechanism 40 to the PCU 14. This improves the usability of the discharge device for a vehicle.

<When Collision is Detected>

The electronic control unit 21 sends a command signal for activating the gas generation portion 62 to the gas generation portion 62. In response to the signal, the explosive is ignited and burned in the gas generation portion 62, to generate combustion gas (see FIG. 5B). Being pushed (driven) by the combustion gas, the movable portion 61 moves to a position where it contacts both the first contact 57a and the second contact 58a. The first contact 57a and the second contact 58a are connected to each other by the movable portion 61 in the switch 50. The series of steps for the operation of the switch 50 is generally executed quickly compared to other types of switches such as electromagnetic switches. Through the quick operation of the switch 50, the discharge mechanism 40 quickly short-circuits between the first bus bar 51 connected to a part of the electric circuit in the vicinity of the anode of the first capacitor 31 and a second bus bar 52 connected to a part in the vicinity of the cathode of the first capacitor 31. The short-circuit causes the discharge mechanism 40 to be connected in parallel with the first capacitor 31. In other words, the discharging resistor 41 is connected between the anode and the cathode of the first capacitor 31. Therefore, the first capacitor 31 is quickly discharged by the discharging resistor 41.

Unlike the prior art in which discharging is performed by the zero torque control (the technique disclosed in Japanese Laid-Open Patent Publication No. 2006-141158), the discharging of the present embodiment is performed in the discharge mechanism 40 connected to the electric circuit. According to the prior art disclosed in the publication, discharging cannot adequately performed if the converter and the inverter in the electric circuit are not operating normally and the zero torque control is not adequately executed. In contrast, according to the first embodiment, discharging is reliably performed regardless of the state of the parts in the electric circuit (the converter 16 and the inverters 17, 18).

According to the first embodiment, the discharge mechanism 40 is integrated with the PCU case 15. Therefore, the parallel connection of the first capacitor 31 in the PCU case 15 with the discharge mechanism 40 is made in the vicinity of the PCU case 15. Therefore, compared to a case where the discharge mechanism 40 is connected to the first capacitor 31 at a position away from the PCU case 15, breakage of lines due to impact is unlikely to occur. In this respect also, discharging can be further reliably performed at the discharging resistor 41.

The first embodiment as described above has the following advantages.

(1) In the electric circuit of the PCU 14, the first bus bar 51 is connected to a part in the vicinity of the anode of the first capacitor 31, and the second bus bar 52 is connected to a part in the vicinity of the cathode. The discharge mechanism 40, which is formed by connecting in series the switch 50 activated by the explosive type actuator 60 and the discharging resistor 41, is integrated with the PCU case 15 (the center case 27) (FIGS. 3, 4). When the collision sensor 24 detects a collision, the first bus bar 51 and the second bus bar 52 are short-circuited by the discharge mechanism 40 through the operation of the switch 50, so that the discharge mechanism 40 and the first capacitor 31 are connected in parallel.

Thus, at the time of detection of a collision, the converter 16 and the inverters 17, 18 in the electric circuit are likely to receive the impact and fail to function normally. However, according to the first embodiment, the first capacitor 31 is reliably discharged by the discharging resistor 41 to adequately lower the potential at each part in the electric circuit of the PCU 14 without being influenced by the state of these parts (the converter 16 and the inverters 17, 18).

Also, the parallel connection of the discharge mechanism 40 with the first capacitor 31 in the PCU case 15 is made in the vicinity of the PCU case 15. Compared to a case where the discharge mechanism 40 is connected to the first capacitor 31 at a position away from the PCU case 15, breakage of lines due to impact is unlikely to occur. Thus, discharging can be further reliably performed at the discharging resistor 41.

Also, since the discharge mechanism 40 is integrated with the PCU case 15, the size of the discharge device for a vehicle is not increased by addition of the discharge mechanism 40.

(2) The discharge mechanism 40 is integrated with the PCU case 15 on the outer wall of the PCU case 15 (the center case 27).

Therefore, when adding the discharge mechanism 40 to the electric circuit of the PCU 14, the work for the addition is performed outside the PCU case 15. That is, the interior of the PCU case 15 does not need to be modified, the work of the addition is facilitated compared to a case where such addition is done inside the PCU case 15. For the same reasons, the maintenance of the discharge mechanism 40 is facilitated.

(3) The explosive type actuator 60 includes the movable portion 61, which is movably provided in the housing 55, and the gas generation portion 62, which is provided in the housing 55 and ignites and burns explosive in response to detection of an abnormality (FIG. 5A). The combustion gas generated by the gas generation portion 62 pushes and moves the movable portion 61, so that the switch 50 is activated (FIG. 5B).

Through the quick activation of the switch 50, the first bus bar 51 and the second bus bar 52 are quickly short-circuited, so that the discharge mechanism 40 is quickly connected in parallel with the first capacitor 31. Accordingly, the first capacitor 31 is promptly discharged.

Second Embodiment

Figure 6:
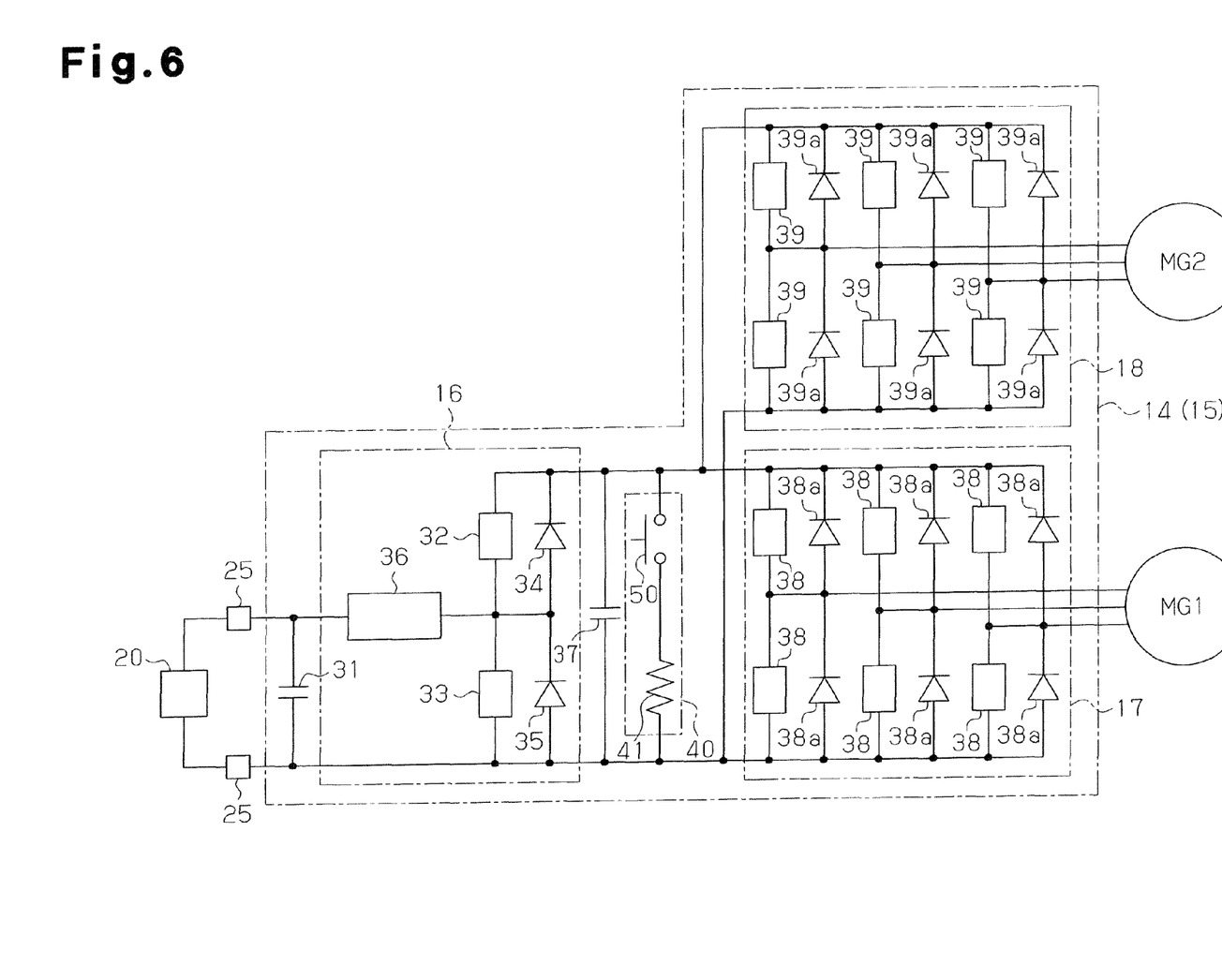
FIG. 6 is a circuit diagram showing the electric circuit of a discharge device for a vehicle according to a second embodiment of the present invention.
Figure 7:
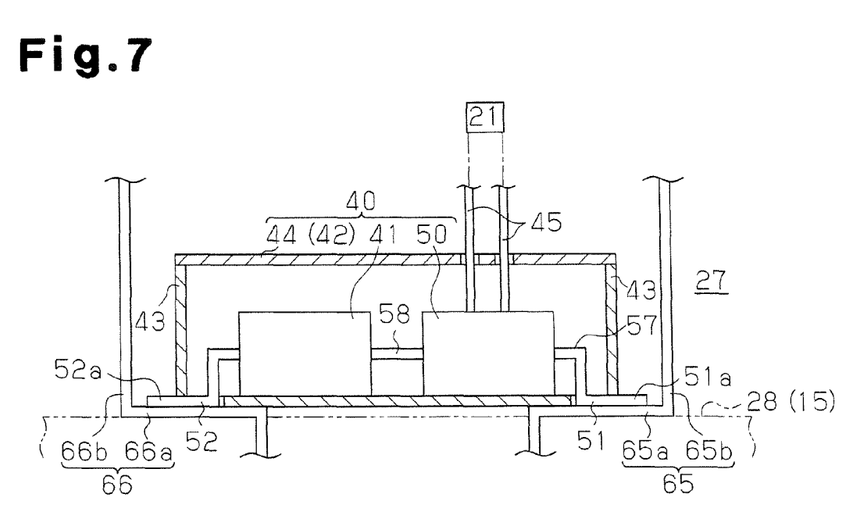
FIG. 7 is a schematic cross-sectional view showing the discharge mechanism integrated with the interior of the POD case in the electric circuit of FIG. 6.

A discharge device for a vehicle according to a second embodiment of the present invention will now be described with reference to FIGS. 6 and 7.

In the second embodiment, the second capacitor 37 is discharged by the discharge mechanism 40 in addition to stopping of electricity supply from the storage battery 20 to the PCU 14 by activating the breakers 25 when a collision of the vehicle 10 is detected.

The discharge mechanism 40 has an elongated discharge mechanism case 42, a switch 50, and a discharging resistor 41. The switch 50 and the discharging resistor 41 are arranged in the discharge mechanism case 42 and connected to each other in series. A first bus bar 51 is connected to the switch 50, and a second bus bar 52 is connected to the discharging resistor 41. A part of the first bus bar 51 and a part of the second bus bar 52 include connecting terminals 51a, 52a, respectively. The terminals 51a, 52a extend through side plates 43 of the discharge mechanism case 42, and protrude outward from the side plates 43. The switch 50 and the discharging resistor 41 are the same as those described in the first embodiment.

In the lower case 28 of the PCU case 15, bus bars 65, 66 are connected to a part in the vicinity of the anode and a part in the vicinity of the cathode of the second capacitor 37, respectively. The bus bars 65, 66 form a part of the electric circuit. The bus bar 65 has a lateral plate 65a and a vertical plate 65b, and the bus bar 66 has a lateral plate 66a and a vertical plate 66b. The lateral plates 65a, 66a extend horizontally and toward the opposite directions along the second capacitor 37 in the center case 27. The vertical plates 65b, 66b extend upward from the extended ends of the lateral plates 65a, 66a, respectively. The discharge mechanism case 42 is arranged between the vertical plates 65b, 66b in the center case 27. The connecting terminal 51a of the first bus bar 51 is fixed to contact the lateral plate 65a, and the connecting terminal 52a of the second bus bar is fixed to contact the lateral plate 66a. Accordingly, the discharge mechanism 40 is integrated with the PCU case 15 inside the PCU case 15 (the center case 27).

Other than the differences discussed above, the configuration is the same as the first embodiment. Therefore, like or the same reference numerals are given to those components that are like or the same as the corresponding components of the first embodiment and detailed explanations are omitted.

The second embodiment is different from the first embodiment in that the target of discharging performed by the discharge mechanism 40 is the second capacitor 37, and that the discharging is performed inside the PCU case 15 (the center case 27). The second embodiment basically has the same advantages as the first embodiment, at least with respect to the advantages (1) and (3) of the first embodiment. The second embodiment provides the following advantage instead of the advantage (2).

(4) The discharge mechanism 40 is integrated with the PCU case 15 inside the PCU case 15 (the center case 27).

Therefore, the discharge mechanism 40 is covered with and protected by the PCU case 15, so that the discharge mechanism 40 is suitable, for example, for being transported. This makes the discharge device for a vehicle compact.

Third Embodiment

A discharge device for a vehicle according to a third embodiment of the present invention will now be described with reference to FIGS. 8 to 10.

In the third embodiment, the first capacitor 31 and the second capacitor 37 are discharged by a common discharge mechanism 40 in addition to stopping of electricity supply from the storage battery 20 to the PCU 14 by activating the breakers 25 when a collision of the vehicle 10 is detected.

Figure 8:
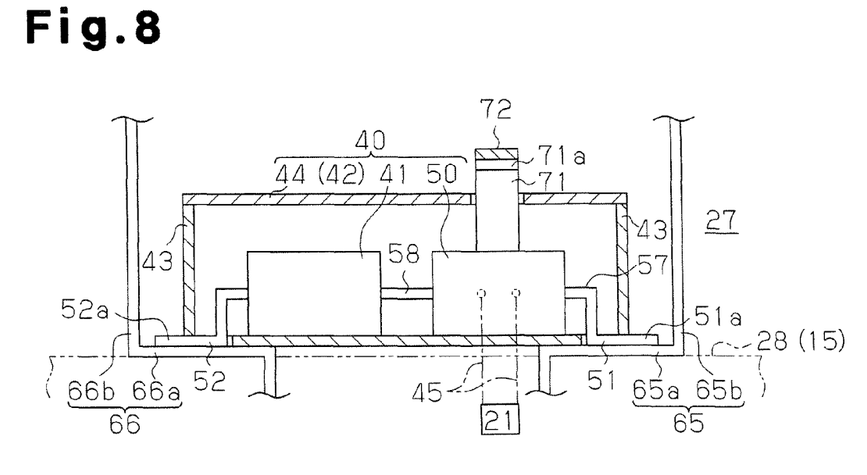
FIG. 8 is a schematic cross-sectional view of a third embodiment of the present invention, showing a discharge mechanism integrated with the interior of a PCU case.
Figure 9:
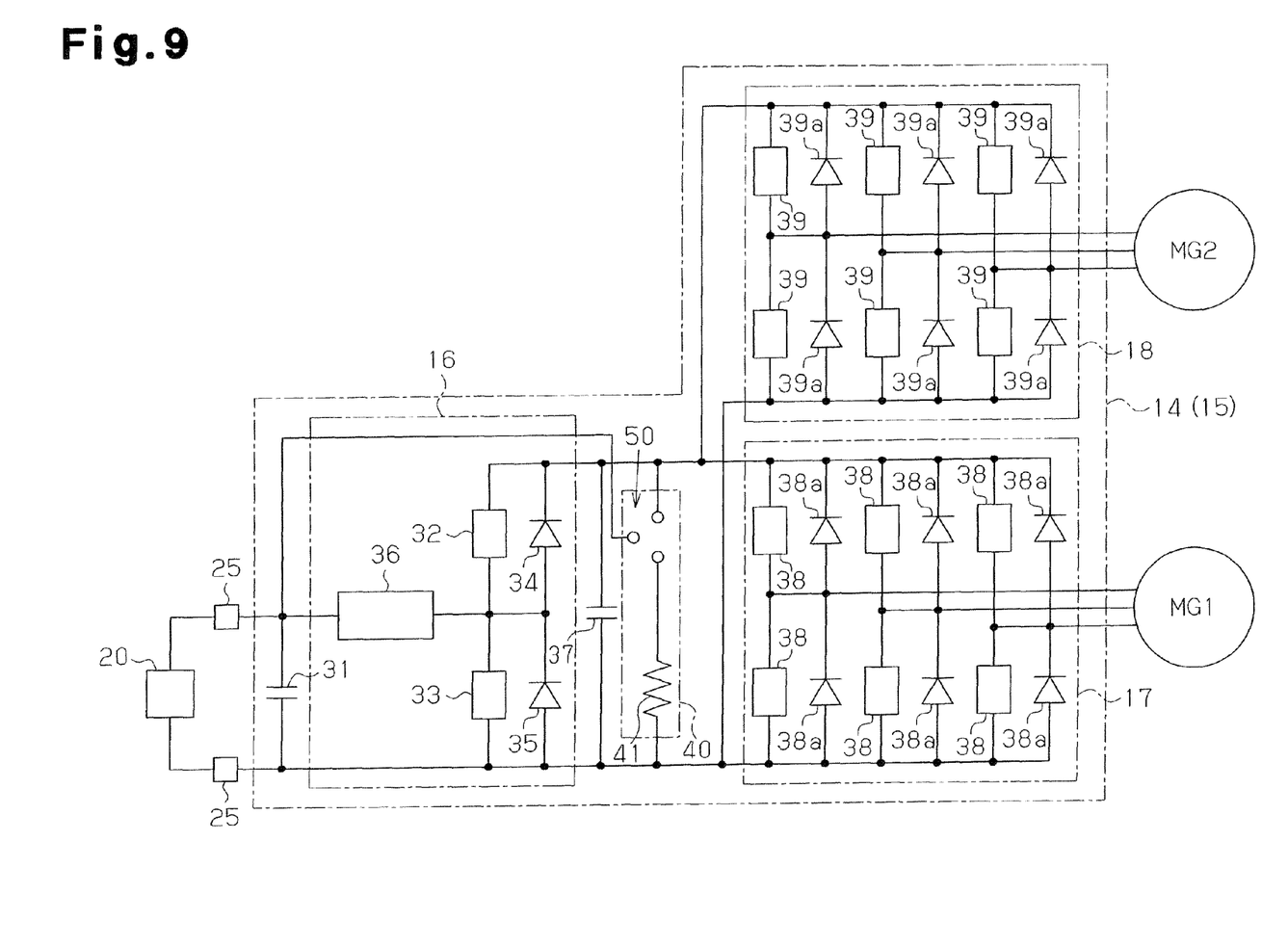
FIG. 9 is a circuit diagram showing an electric circuit of the discharge device for a vehicle according to the third embodiment.

As shown in FIG. 8, the discharge mechanism 40 has an elongated discharge mechanism case 42, a switch 50, and a discharging resistor 41. The switch 50 and the discharging resistor 41 are arranged in the discharge mechanism case 42 and connected to each other in series. Two first bus bars 51, 71 are connected to the switch 50, and a second bus bar 52 is connected to the discharging resistor 41. A part of one of the first bus bars 51 and a part of the second bus bar 52 include connecting terminals 51a, 52a, respectively. The terminals 51a, 52a extend through side plates 43 of the discharge mechanism case 42, and protrude outward from the side plates 43. A part of the other first bus bar 71 includes a terminal 71a, which extends through a top plate of the discharge mechanism case 42 and is located outside the discharge mechanism case 42. The switch 50 and the discharging resistor 41 are the same as those described in the first embodiment.

In the lower case 28 of the PCU case 15, a bus bar 65 is connected to a part in the vicinity of the anode of the second capacitor 37. The bus bar 65 forms a part of the electric circuit. Also, a bus bar 66, which forms a part of the electric circuit, is connected to each of a part in the vicinity of the cathode of the first capacitor 31 and a part in the vicinity of the cathode of the second capacitor 37. The bus bar 65 has a lateral plate 65a and a vertical plate 65b, and the bus bar 66 has a lateral plate 66a and a vertical plate 66b. The lateral plates 65a, 66a extend horizontally and toward the opposite directions along the second capacitor 37 in the center case 27. The vertical plates 65b, 66b extend upward from the extended ends of the lateral plates 65a, 66a, respectively. Further, a bus bar 72, which forms a part of the electric circuit, is connected to a part in the vicinity of the anode of the first capacitor 31, that is, to a path that connects the anode of the first capacitor 31 and the diodes 34, 35 to each other.

The discharge mechanism case 42 is arranged between the vertical plates 65b, 66b. The connecting terminal 5la of the first bus bar 51, which protrudes from one of the side plates 43 of the discharge mechanism case 42 is fixed to contact the lateral plate 65a. The connecting terminal 52a of the second bus bar 52, which protrudes from the other side plate 43 is fixed to contact the lateral plate 66a. Further, the connecting terminal 71a protruding from the top plate 44 of the discharge mechanism case 42 contacts and is fixed to the bus bar 72. Accordingly, the discharge mechanism 40 is fixed integrally with the PCU case 15 inside the PCU case 15 (the center case 27).

Figure 10A:
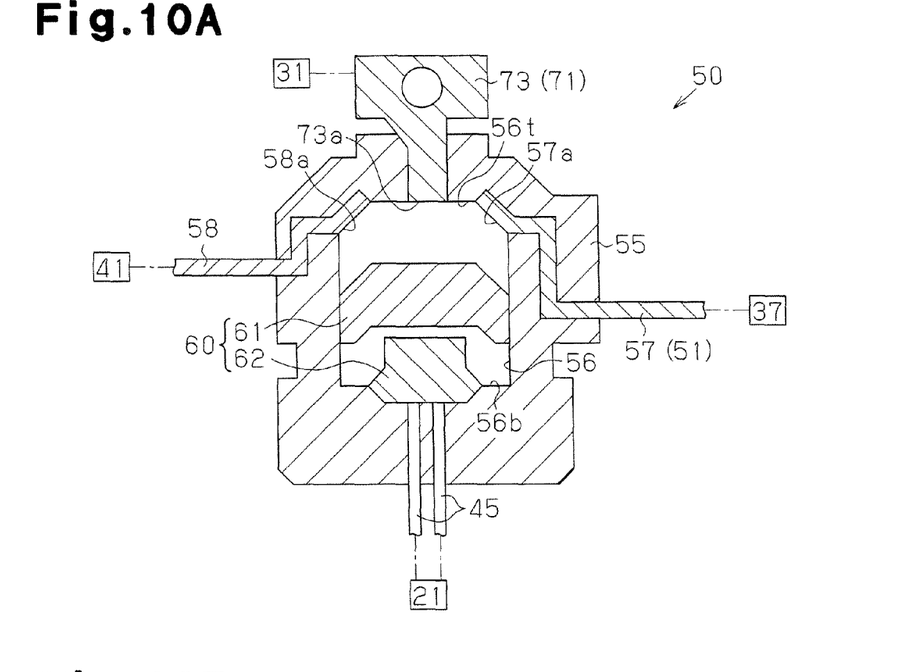
FIGS. 10A and 10B are cross-sectional views showing the internal structure of the switch according to the third embodiment.
Figure 10B:
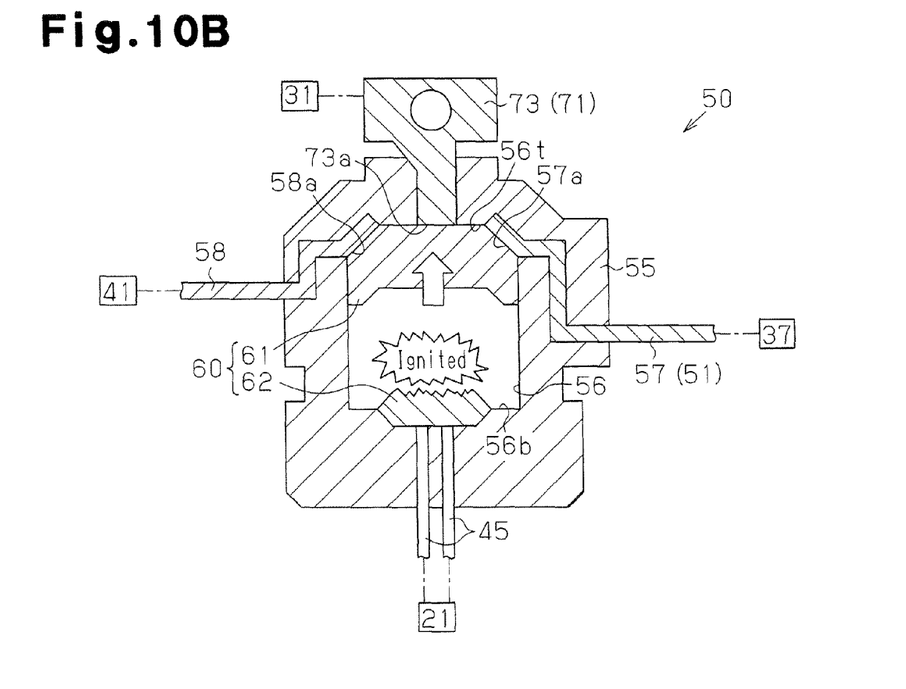

FIG. 10A illustrates the internal structure of the switch 50. As shown in FIG. 10A, the switch 50 is configured such that three separate terminals, or first to third terminals 57, 58, 73 connect the interior of the cylinder 56 to the outside of the housing 55. The first terminal 57 is formed by the first bus bar 51, which is connected to a part in the vicinity of the anode of the second capacitor 37, specifically, by an end of the first bus bar 71 that is located in the vicinity of the switch 50. The third terminal 73 is formed by the first bus bar 71, which is connected to a part in the vicinity of the anode of the first capacitor 31, specifically, by an end of the first bus bar 51 that is located in the vicinity of the switch 50. In contrast, the second terminal 58 is connected to the discharging resistor 41. A part of the first terminal 57 (a first contact 57a) and a part of the second terminal 58 (a second contact 58a) are exposed in the vicinity of the corners of the top 56t of the cylinder 56. A part of the third terminal 73 (a third contact 73a) is exposed at the top 56t of the cylinder 56.

An explosive type actuator 60 is arranged in the housing 55. The explosive type actuator 60 includes a movable portion 61 and a gas generation portion 62.

Other than the differences discussed above, the configuration is the same as the first embodiment. Therefore, like or the same reference numerals are given to those components that are like or the same as the corresponding components of the first embodiment and detailed explanations are omitted.

The discharge mechanism 40 operates in the following manner in accordance with a result of detection by the collision sensor 24 (whether or not there has been a collision of the vehicle 10).

<When No Collision is Detected>

The electronic control unit 21 does not send a command signal for activating the gas generation portion 62 to the gas generation portion 62. In the gas generation portion 62, the explosive is not ignited, and no combustion gas is generated. In the switch 50, the movable portion 61 is located at a position where it does not contact the first contact 57a, the second contact 58a, or the third contact 73a (see FIG. 10A). Therefore, the first contact 57a, the second contact 58a, and the third contact 73a are not connected to each other in the switch 50. The anode of the first capacitor 31 and the discharging resistor 41 are not connected to each other, and the anode of the second capacitor 37 and the discharging resistor 41 are not connected to each other, either.

Therefore, even though the discharge mechanism 40 for discharging the first capacitor 31 and the second capacitor 37 is provided, the discharge mechanism 40 has little influence on the property of the electric circuit of the PCU 14 (see FIG. 9), which contains the first capacitor 31 and the second capacitor 37, when no abnormality of the vehicle 10 is detected. Thus, when providing the discharge mechanism 40 to discharge the first capacitor 31 and the second capacitor 37, the discharge mechanism 40 is applied to the PCU 14 substantially without changing the electric circuit of the PCU 14. As described above, according to the third embodiment, a discharge device for a vehicle can be easily obtained by simply adding the discharge mechanism 40 to the PCU 14. This improves the usability of the discharge device for a vehicle.

<When Collision is Detected>

The electronic control unit 21 sends a command signal for activating the gas generation portion 62 to the gas generation portion 62. In response to the signal, the explosive is ignited and burned in the gas generation portion 62, to generate combustion gas. Being pushed by the combustion gas, the movable portion 61 moves to a position where it contacts each of the first contact 57a, the second contact 58a, and the third contact 73a (see FIG. 10B). The first contact 57a, the second contact 58a, and the third contact 73a are connected to each other by the movable portion 61 in the switch 50.

The series of steps of the operation of the switch 50 is generally executed quickly compared to other types of switches such as electromagnetic switches. Through the quick operation of the switch 50, the discharge mechanism 40 quickly short-circuits between the first bus bar 51 connected to a part in the vicinity of the anodes of the first and second capacitors 31, 37 and a second bus bar 52 connected to a part in the vicinity of the cathodes of the first and second capacitors 31, 37. The short-circuit causes the discharge mechanism 40 to be connected in parallel with the first capacitor 31 and with the second capacitor 37. In other words, the discharging resistor 41 is connected between the anode and the cathode of the first capacitor 31, and between the anode and the cathode of the second capacitor 37. Therefore, the first capacitor 31 and the second capacitor 37 are quickly discharged by the discharging resistor 41, and the potential at each part in the electric circuit of the PCU 14 is reliably lowered.

Therefore, although the third embodiment is different from the second embodiment in that the target of discharging performed by the discharge mechanism 40 includes both the first capacitor 31 and the second capacitor 37, the third embodiment basically has the same advantages as the second embodiment, that is, the advantages (1), (3), and (4) of the second embodiment.

In addition, the third embodiment has the following advantage.

(5) The first capacitor 31 and the second capacitor 37 are discharged by the common discharge mechanism 40. Therefore, only one discharge mechanism 40 is needed. This reduces the costs of the discharge device for a vehicle. Also, discharging of the two capacitors 31, 37 can be started substantially simultaneously.

The present invention may be embodied in the following forms.

In the third embodiment, the first capacitor 31 and the second capacitor 37 are arranged in different ones of the upper case 26, the center case 27, and the lower case 28. Instead, the capacitors 31, 37 may be arranged in the same case.

Figure 11:
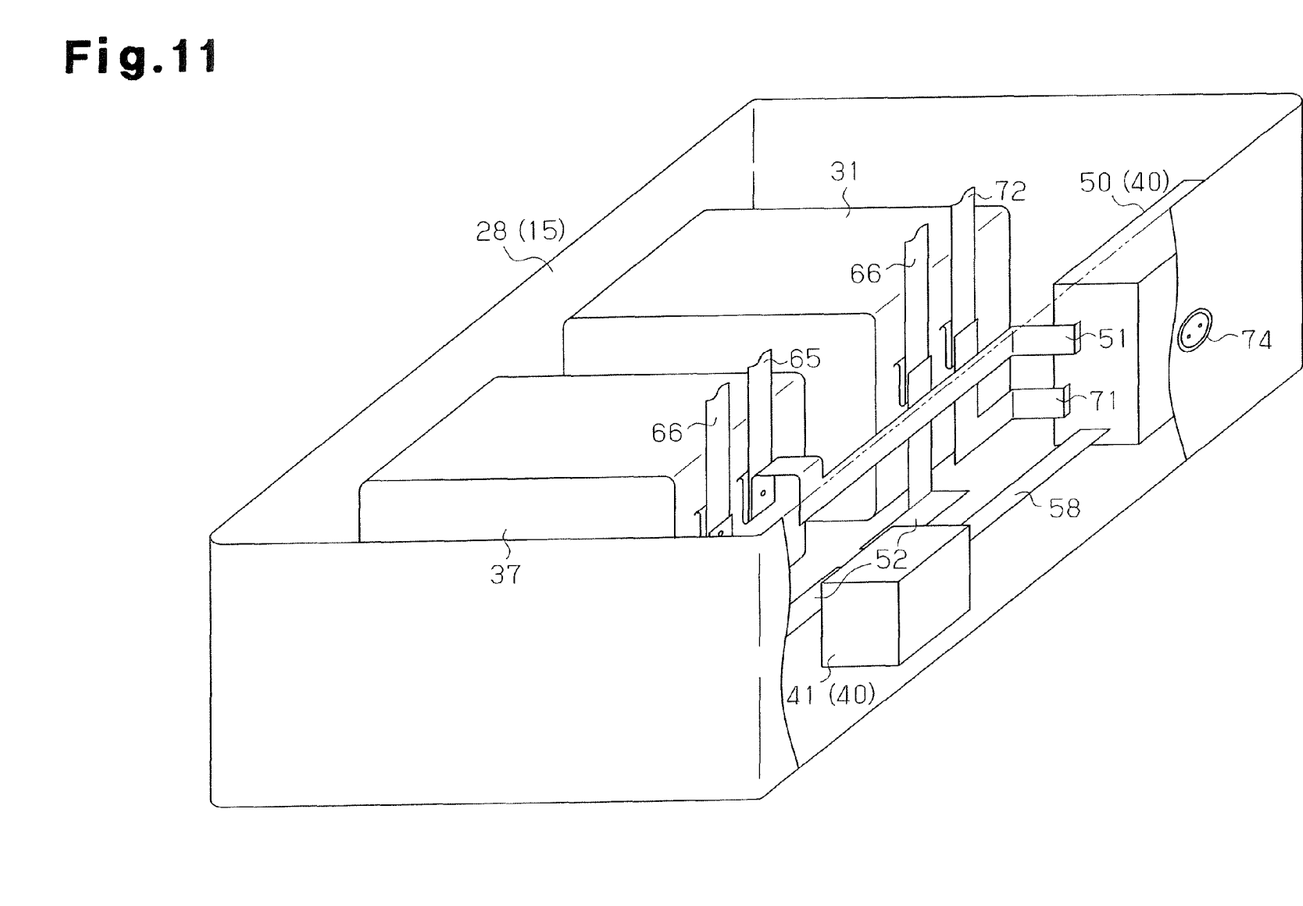
FIG. 11 is a perspective view, with a part of the lower case cut away, showing a discharge device for a vehicle according to a modification of the third embodiment.

FIG. 11 shows one example of a discharge device for a vehicle in which the capacitors 31, 37 are both arranged in the lower case 28.

The switch 50 and the discharging resistor 41 are not arranged in the discharge mechanism case 42, but fixed to the inner bottom of the lower case 28, while being connected in series to each other.

Two bus bars 51, 71 are connected to the switch 50. One of the first bus bars, or the first bus bar 51, extends from the anode of the second capacitor 37 and is connected to a bus bar 65, which forms a part of the electric circuit. The other one of the first bus bars, or the first bus bar 71, extends from the anode of the first capacitor 31 and is connected to a bus bar 72, which forms a part of the electric circuit.

The switch 50 and the discharging resistor 41 are connected to each other via the second terminal 58.

Second bus bars 52 extend from the discharging resistor 41. Bus bars 66, which form a part of an electric circuit, extend from the cathode of the first capacitor 31 and the cathode of the second capacitor 37, respectively. The second bus bars 52 are respectively connected to the bus bars 66.

A member designated with reference numeral "74" in FIG. 11 is a connector for inputting signals into the switch 50. The connector 74 is arranged on the outer wall of the PCU case (the lower case 28).

In this manner, the discharge mechanism 40, which has the switch 50 and the discharging resistor 41, is fixed to the PCU case 15 (the lower case 28).

This configuration has the same advantages as the third embodiment.

In the above illustrated embodiments, the time at which the collision sensor 24 detects a collision of the vehicle 10 is defined as the time of detection of an abnormality. However, the time at which a vehicle collision is predicted may be defined as the time of abnormality detection. Prediction of a collision is carried out, for example, in the following manner. A collision velocity between an obstacle and the vehicle (the relative speed between an obstacle and the vehicle) and the distance between the obstacle and the vehicle is detected by a radar sensor. As a radar sensor, a millimeter-wave radar for cruise control may be used, for example. In a pre-crash controller, the possibility of a collision is determined based on detection signals of the radar sensor. The time at which the pre-crash controller determines that a collision cannot be avoided is defined as the time of abnormality detection.

The present invention may be applied to a discharge device for a vehicle in an electric circuit that has one, or three or more capacitors and discharges the capacitor(s).

The present invention can be applied not only to an electric circuit to which the storage battery 20 is connected as an electricity source, but also to an electric circuit to which a commercial power source is connected as an electricity source.

The discharge device for a vehicle according to the present invention may be applied not only to a hybrid vehicle, but also an electric vehicles or a fuel cell vehicle.

Therefore, the present examples and embodiments are to be considered as illustrative and not restrictive and the invention is not to be limited to the details given herein, but may be modified within the scope and equivalence of the appended claims.

The invention claimed is:

1. A discharge device for use in a vehicle including:
   an electric circuit activated by electricity supply from an electricity source;
   at least one capacitor contained in the electric circuit, the capacitor having an anode and a cathode; and
   a case for accommodating the electric circuit,
   wherein, when an abnormality related to a collision of the vehicle is detected, the electricity supply from the electricity source to the electric circuit is stopped,
   the discharge device comprising:
   a discharge mechanism that discharges the at least one capacitor when the electricity supply from the electricity source to the electric circuit is stopped due to said abnormality;
   a first bus bar connected to a part of the electric circuit that is in the vicinity of the anode of the at least one capacitor; and
   a second bus bar connected to a part of the electric circuit that is in the vicinity of the cathode of the at least one capacitor,
   wherein the discharge mechanism includes:
   a switch activated by an explosive type actuator; and
   a discharging resistor that is connected with the switch in series,
   the discharge mechanism being integrated with the case, wherein, at the detection of the abnormality, the switch is activated to short-circuit the first bus bar and the second bus bar with each other, thereby connecting the discharge mechanism in parallel with the at least one capacitor, so that the at least one capacitor is discharged.

2. The discharge device for a vehicle according to claim 1, wherein the discharge mechanism is integrally fixed to the case on an outer wall of the case.

3. The discharge device for a vehicle according to claim 1, wherein the discharge mechanism is integrally fixed to the case inside the case.

4. The discharge device for a vehicle according to claim 1, wherein
   the switch includes a housing for accommodating the explosive type actuator,
   the explosive type actuator includes:
   a movable portion movably arranged in the housing; and
   a gas generation portion arranged in the housing, the gas generating portion igniting and burning explosive in response to the detection of an abnormality, thereby generating combustion gas, and
   the movable portion is pushed by the combustion as generated by the gas generation portion, thereby activating the switch.

5. The discharge device for a vehicle according to claim 1, wherein
the electricity source includes a storage battery,
the electric circuit includes a converter circuit for increasing the voltage of le storage battery, and
the at least one capacitor includes at least one of a first capacitor to which input voltage of the converter circuit is applied and a second capacitor to which an output voltage of the converter circuit is applied.

6. A vehicle comprising:
an electric circuit activated by electricity supply from an electricity source;
at least one capacitor contained in the electric circuit, the capacitor having an anode and a cathode;
a case for accommodating the electric circuit; and
a discharge device having a discharge mechanism;
wherein, when an abnormality related to a collision of the vehicle is detected, the electricity supply from the electricity source to the electric circuit is stopped and the at least one capacitor is discharged by the discharge mechanism,
the discharge device further including:
a first bus bar connected to a part of the electric circuit that is in the vicinity of the anode of the at least one capacitor; and
a second bus bar connected to a part of the electric circuit that is in the vicinity of the cathode of the at least one capacitor,
wherein the discharge mechanism includes:
a switch activated by an explosive type actuator; and
a discharging resistor that is connected with the switch in series,
the discharge mechanism being integrated with the case, wherein, at the detection of the abnormality, the switch is activated to short-circuit the first bus bar and the second bus bar with each other, thereby connecting the discharge mechanism in parallel with the at least one capacitor, so that the at least one capacitor is discharged.

7. The vehicle according to claim 6, wherein
the electricity source includes a storage battery,
the electric circuit includes a converter circuit for increasing the voltage of the storage batter, and
the at least one capacitor includes at least one of a first capacitor to which input voltage of the converter circuit is applied and a second capacitor to which an output ltage of the converter circuit is applied.

8. The vehicle according to claim 6, further comprising a collision sensor for detecting a collision of the vehicle.

* * * * *